(12) United States Patent
Franke et al.

(10) Patent No.: US 10,465,661 B2
(45) Date of Patent: Nov. 5, 2019

(54) METHOD FOR MONITORING THE VIBRATIONAL STATE OF A WIND TURBINE

(71) Applicant: INNOGY SE, Essen (DE)

(72) Inventors: Jan-Bernd Franke, Elmshorn (DE); Sebastian Kulse, Oberhausen (DE)

(73) Assignee: INNOGY SE, Essen (DE)

( * ) Notice: Subject to any disclaimer, the term of this patent is extended or adjusted under 35 U.S.C. 154(b) by 0 days.

(21) Appl. No.: 16/076,860

(22) PCT Filed: Feb. 15, 2017

(86) PCT No.: PCT/EP2017/053426
§ 371 (c)(1),
(2) Date: Aug. 9, 2018

(87) PCT Pub. No.: WO2017/144327
PCT Pub. Date: Aug. 31, 2017

(65) Prior Publication Data
US 2019/0078557 A1    Mar. 14, 2019

(30) Foreign Application Priority Data
Feb. 25, 2016 (DE) .......... 10 2016 203 013

(51) Int. Cl.
*F03D 17/00* (2016.01)

(52) U.S. Cl.
CPC .......... *F03D 17/00* (2016.05); *F05B 2260/80* (2013.01); *F05B 2270/334* (2013.01); *F05B 2270/807* (2013.01)

(58) Field of Classification Search
CPC ...................................................... F03D 17/00
(Continued)

(56) References Cited

U.S. PATENT DOCUMENTS

| 8,202,048 B2 | 6/2012 | Stiesdal et al. |
| 2004/0112131 A1 | 6/2004 | Wobben |

(Continued)

FOREIGN PATENT DOCUMENTS

| CN | 201417174 Y | 6/2009 |
| CN | 201448194 U | 6/2009 |

(Continued)

OTHER PUBLICATIONS

Office action dated Sep. 18, 2018 in related South Korean Patent Application No. 10-2018-7024438, filed Feb. 15, 2017.
(Continued)

*Primary Examiner* — Nimeshkumar D Patel
*Assistant Examiner* — Tarun Sinha
(74) *Attorney, Agent, or Firm* — Wiley Rein LLP

(57) ABSTRACT

The invention relates to a method for monitoring the vibrational state of a wind turbine comprising detecting a plurality of acceleration values that represent accelerations which a component of the wind turbine is subject to at different respective points in time within a specified time interval, storing the acceleration values in an acceleration data set; generating a sum frequency distribution on the basis of the acceleration data set, comparing a first sum frequency value of the sum frequency distribution with a second sum frequency value of a threshold sum frequency distribution for at least one acceleration value, and outputting a warning signal if the second sum frequency value is greater than the first sum frequency value.

10 Claims, 3 Drawing Sheets

(58) Field of Classification Search
USPC .......................................................... 73/570
See application file for complete search history.

(56) References Cited

U.S. PATENT DOCUMENTS

| | | | | |
|---|---|---|---|---|
| 2008/0041135 A1* | 2/2008 | Okai | ..................... | B60T 8/885 |
| | | | | 73/1.38 |
| 2009/0319199 A1* | 12/2009 | Volkmer | .............. | F03D 7/0224 |
| | | | | 702/41 |
| 2013/0167624 A1 | 7/2013 | Shoda | | |
| 2015/0000404 A1* | 1/2015 | Brenner | .................. | F03D 17/00 |
| | | | | 73/579 |
| 2016/0084233 A1* | 3/2016 | Evans | ..................... | F03D 17/00 |
| | | | | 73/112.01 |
| 2016/0366364 A1* | 12/2016 | Fechner | .............. | G07C 5/0866 |

FOREIGN PATENT DOCUMENTS

| | | |
|---|---|---|
| CN | 103197618 A | 2/2013 |
| CN | 103675357 A | 3/2014 |
| CN | 1041411154 A | 6/2014 |
| DE | 102010009941 A1 | 9/2011 |
| JP | 2004-523689 A | 8/2004 |
| JP | 2008-274953 A | 11/2008 |
| JP | 2009-243428 A | 10/2009 |
| KR | 10-0954090 B1 | 4/2010 |
| WO | 2007/131489 A1 | 11/2007 |

OTHER PUBLICATIONS

International Search Report and Written Opinion dated Apr. 21, 2017 in International Patent Application No. PCT/EP2017/053426, filed Feb. 15, 2017.
International Preliminary Report on Patentability and Written Opinion dated Aug. 28, 2018, in International Application No. PCT/EP2017/053426, filed Feb. 15, 2017.
Corresponding Japanese Official Action dated Mar. 4, 2019 in the name of Innogy SE, Application No. 2018-544906, 5 pages.
Corresponding Chinese Official action dated Mar. 1, 2019 in the name of Innogy SE, application No. 201780013642.7, 6 pgs.

* cited by examiner

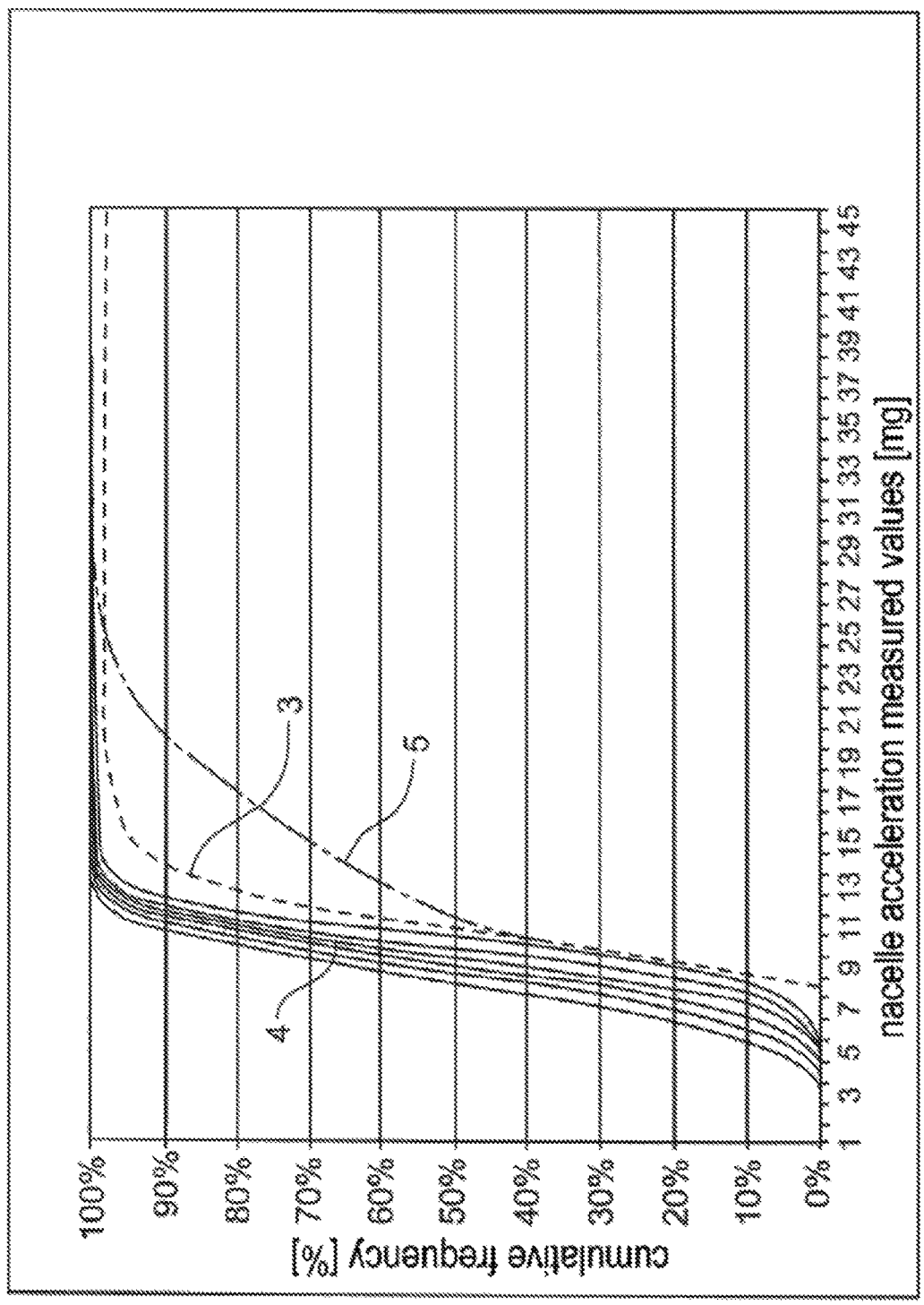

METHOD FOR MONITORING THE VIBRATIONAL STATE OF A WIND TURBINE

RELATED APPLICATIONS

This Application is a § 371 National Stage Application of PCT/EP2017/053426, filed Feb. 15, 2017, which claims priority benefit of German Patent Application No. 102016203013.2, filed Feb. 25, 2016, which applications are incorporated entirely by reference herein for all purposes.

FIELD

The present invention relates to a method for monitoring the vibration state of a wind turbine.

BACKGROUND ART

Wind turbines, which are also referred to as wind power plants, are subjected to a variety of influences which excite vibrations. Furthermore, in particular the nacelle of a wind turbine is subjected to permanent vibrations because of the rotation of the rotor hub and the rotor blades connected to the nacelle, even if the wind is incident on the rotor blades at a constant speed.

Monitoring the vibration behavior of wind turbines using acceleration sensors, which are attached to a component of the wind turbine, preferably to the nacelle of the wind turbine, is known from the prior art. Acceleration values representing accelerations of the component may be detected by means of the acceleration sensors, which values are processed by a controller of the wind turbine by comparing the detected acceleration values to predefined acceleration limiting values. If an acceleration limiting value is exceeded, alarms are triggered and/or the wind turbine is stopped. This type of vibration monitoring involves a simple sensor system and a simple monitoring logic, which are provided in every wind turbine due to permitting guidelines and/or certification requirements.

This type of vibration monitoring is used to prevent the wind turbine from temporarily entering resonance. Such resonances can arise due to unfavorable external excitations/influences, thus, for example, unusual wind and/or wave conditions and also malfunctions of the wind turbine regulation. A longer continuous operation of a wind turbine in the state of resonance can result in damage and short-term structural failure of components of the wind turbines.

The acceleration limiting values for triggering an alarm and for initiating a shutdown of the wind turbine are relatively high, and therefore only a few alarm triggers and shutdowns occur in regular operation of the wind turbine. Furthermore, the method for monitoring the vibration state of a wind turbine known from the prior art has the problem that the acceleration limiting value for triggering an alarm is frequently only reached when, for example, the structural integrity of a rotor blade is restricted in such a manner that, a very short time (a few seconds) after exceeding the acceleration limiting value to trigger an alarm, the acceleration limiting value for the shutdown of the wind turbine is already exceeded, because damage to the rotor blade proceeds very rapidly, for example an entire rotor blade is thrown off.

This form of monitoring the vibration state is suitable for avoiding short-term structural failure due to resonance-related overload. This monitoring of threshold value or limiting value is not suitable for a state evaluation of the entire wind turbine or individual component parts/components thereof, for example the rotor blades, since small differences in the vibration behavior do not result in triggering of the alarm or shutdown thresholds, which are very high.

SUMMARY OF THE INVENTION

The object on which the present invention is based is to provide a method for monitoring the vibration state of a wind turbine, by means of which a reduction of the structural integrity of a component of the wind turbine can be recognized early.

The object on which the present invention is based is achieved by a method having the features of claim 1. Advantageous embodiments of the method according to the invention are described in the dependent claims.

More precisely, the object on which the present invention is based is achieved by a method for monitoring the vibration state of a wind turbine, which has the following method steps:

detecting a plurality of acceleration values, which represent accelerations to which a component of the wind turbine is subjected, each at different points in time within a predefined time interval;

storing the acceleration values in an acceleration dataset;

generating a cumulative frequency distribution based on the acceleration dataset;

comparing a first cumulative frequency value of the cumulative frequency distribution to a second cumulative frequency value of a limiting cumulative frequency distribution for at least one acceleration value; and outputting a warning signal if the second cumulative frequency value is greater than the first cumulative frequency value.

By means of the method according to the invention for monitoring the vibration state of a wind turbine, changes and weakenings of the structural integrity of components of the wind turbine may be recognized early. It is thus possible to prevent damage which prevents the functionality of the wind turbine from occur-ring suddenly and surprisingly, thus, for example, throwing off of a rotor blade of the wind turbine. Corresponding damage which prevents the functionality of the wind turbine can be initiated, for example, by breaking of a fastening bolt for fastening a rotor blade on the rotor hub. After breaking of the fastening bolt, as a result thereof the load limits of further fastening bolts can be exceeded, and there-fore finally the rotor blade is thrown off from the rotor hub.

Changes and weakenings of the structural integrity of the wind turbine may be recognized early by means of the method according to the invention, since a defect of a component of the wind turbine, thus, for example, a crack in a connecting bolt, a crack in a part of the rotor blade, or a crack in a part of the rotor hub, bearing damage of the rotor hub or bearing damage of the blade bearing, etc., is reflected in a change of the vibration characteristic of the wind turbine. If, for ex-ample, there is a crack in a connecting bolt, this results in a reduced connecting force between the rotor blade and the rotor hub, and therefore greater vibrations and thus greater accelerations of the nacelle result during the operation of the wind turbine.

By taking into consideration a plurality of acceleration values which represent accelerations to which a component (for example, the nacelle) of the wind turbine is subjected during its operation, a change of the vibration characteristic, which is linked to a change of the structural integrity of the wind turbine, can be established in an improved manner. The cumulative frequency distribution of the acceleration values of the component is based on a plurality of acceleration values which represent accelerations of the component of the wind turbine, to which the component is subjected, and therefore a change of the vibration characteristic, for example an increase in part of or all acceleration values, can be recognized reliably.

Within the predefined time interval, acceleration values $a_1, a_2, a_3, \ldots, a_k$ are detected and stored in the acceleration dataset. Each of these acceleration values occurs at an absolute frequency of $n_1, n_2, n_3, \ldots, n_k$ and at a relative frequency of $h_1, h_2, h_3, \ldots, h_k$, wherein the total of the relative frequencies is always 1, and there-fore $h_1+h_2+h_3+\ldots+h_k=1$ applies. The cumulative frequency F(a) is the total of the relative frequencies of all acceleration values $a_1$, which are less than or equal to a. The cumulative frequency distribution is the function of the cumulative frequency as a function of the acceleration values. The cumulative frequency distribution can be represented in a graph, wherein the relative cumulative frequencies, which can also be specified in percent, are plotted against the acceleration values. For this purpose, the acceleration measured values are typically plotted on the abscissa and the relative cumulative frequency is plotted on the ordinate.

The relative cumulative frequency may therefore be determined easily for an acceleration value from the cumulative frequency distribution. Thus, the proportion of all vibrations to which the component of the wind turbine is subjected, which are less than or equal to a predefined acceleration value, can easily be determined from the cumulative frequency distribution. For example, it may be determined from the cumulative frequency distribution that 60% of all vibrations to which the component of the wind turbine is subjected are less than or equal to 9 mg (mg= Milli-g=1/1000 *9.81 m/s$^2$).

The detection of the plurality of acceleration values takes place within a predefined time interval. In this case, the respective acceleration values can be deter-mined at points in time which have equidistant (for example, detection and storage of an acceleration value every second, every 10 seconds, . . . ) or non-equidistant time intervals from one another.

The acceleration values are preferably acceleration measured values of the component, which represent a movement/acceleration of the component in a vibration direction oriented perpendicularly to the wind direction. Furthermore, acceleration measured values can also be detected in the wind direction and/or rotationally on the drivetrain and can be used for the method according to the invention, in order to reliably detect a faulty regulating behavior of the wind turbine.

A component of the wind turbine is to be understood, for example, as the nacelle or a rotor blade of the wind turbine.

The limiting cumulative frequency distribution can be determined, for example, by means of an aeroelastic simulation of the wind turbine behavior.

The method according to the invention can also be referred to as a method for avoiding a sudden failure of a wind turbine due to excessive vibrations.

The limiting cumulative frequency distribution is preferably generated by the following method steps, which are executed in a time interval before the detection of the plurality of acceleration values:

detecting a plurality of acceleration values, which represent accelerations to which the component of the wind turbine is subjected, each at different points in time within a predefined initial time interval;

storing these acceleration values in an initial acceleration dataset;

generating an initial cumulative frequency distribution based on the initial acceleration dataset; and generating the limiting cumulative frequency distribution based on the determined initial cumulative frequency distribution.

The correspondingly designed method offers the advantage that the vibration history of the component of the wind turbine is used to generate the limiting cumulative frequency distribution. Changes of the vibration characteristic of the wind turbine may therefore be comprehended and detected particularly well.

This method in consideration of the vibration history of the component of the wind turbine may also be described by the following method steps:

detecting a plurality of first acceleration values, which represent accelerations to which a component of the wind turbine is subjected, each at different points in time within a predefined first-time interval;

storing the first acceleration values in a first acceleration dataset;

generating a first cumulative frequency distribution based on the first acceleration dataset;

generating a limiting frequency distribution based on the determined first cumulative frequency distribution;

detecting a plurality of second acceleration values, which represent accelerations to which the component of the wind turbine is subjected, each at different points in time within a second-time interval;

storing the second acceleration values in a second acceleration dataset;

generating a second cumulative frequency distribution based on the second acceleration dataset;

comparing a cumulative frequency value of the second cumulative frequency distribution to a cumulative frequency value of the limiting cumulative frequency distribution for at least one acceleration value; and outputting a warning signal if the cumulative frequency value of the limiting cumulative frequency distribution is greater than the cumulative frequency value of the second cumulative frequency distribution.

The second-time interval follows the first-time interval with respect to time.

The limiting cumulative frequency distribution for a wind turbine of a wind turbine fleet consisting of a plurality of structurally-equivalent wind turbines is preferably generated by the following method steps, which are executed in a time interval before detecting the plurality of acceleration values:

for at least two wind turbines of the wind turbine fleet, detecting a plurality of acceleration values, which represent accelerations to which the component of the respective wind turbine is subjected, each at different points in time within a predefined initial time interval;

storing these acceleration values in an initial acceleration dataset;

generating an initial cumulative frequency distribution based on the initial acceleration dataset; and generating the limiting cumulative frequency distribution based on the determined initial cumulative frequency distribution.

The correspondingly designed method offers the advantage that the vibration characteristics of a plurality of structurally-equivalent wind turbines are used to generate the limiting cumulative frequency distribution, and therefore the limiting cumulative frequency distribution thus generated is more accurate. Possible outliers of acceleration values in a wind turbine, which is also used to determine the limiting cumulative frequency distribution, average out due to consideration of acceleration values of further wind turbines, which are also used to determine the limiting cumulative frequency distribution. The change of the vibration characteristic and thus, for example, a change of the structural integrity of the wind turbine to be checked/monitored can therefore be established in an improved manner, whereby the operational reliability of the wind turbine to be checked/monitored is enhanced once again.

The wind turbine fleet consists of a plurality of structurally-equivalent wind turbines. They do not necessarily have to be assembled in a wind turbine park. The respective wind turbines of the wind turbine fleet can also be erected at locations very remote from one another. A wind turbine fleet can comprise, for example, one or more wind turbine parks.

The plurality of acceleration values is preferably detected for more than two, preferably for all wind turbines of the wind turbine fleet within the initial time interval and/or within different initial time intervals.

This method in consideration of the vibration history of a plurality of structurally-equivalent wind turbines, which are executed in a time interval before detecting the plurality of acceleration values, may also be described by the following method steps:

detecting a plurality of first acceleration values, which represent accelerations to which a component of the wind turbine is subjected, each at different points in time within a predefined first-time interval, for at least two of the wind turbines, preferably for all of the wind turbines of the wind turbine fleet;

storing the first acceleration values in a first acceleration dataset;

generating a first cumulative frequency distribution based on the first acceleration dataset;

generating a limiting cumulative frequency distribution based on the determined first cumulative frequency distribution;

detecting a plurality of second acceleration values, which represent accelerations to which the component of the wind turbine is subjected, each at different points in time within a second-time interval;

storing the second acceleration values in a second acceleration dataset;

generating a second cumulative frequency distribution based on the second acceleration dataset;

comparing a cumulative frequency value of the second cumulative frequency distribution to a cumulative frequency value of the limiting cumulative frequency distribution for at least one acceleration value; and outputting a warning signal if the cumulative frequency value of the limiting cumulative frequency distribution is greater than the cumulative frequency value of the second cumulative frequency distribution.

The limiting cumulative frequency distribution is preferably generated in that a limiting acceleration dataset is generated by adding an additional acceleration value to each of the acceleration values detected in the initial time interval and stored in the initial acceleration dataset. This limiting acceleration dataset is stored. Subsequently, the limiting cumulative frequency distribution is generated based on the limiting acceleration dataset.

The correspondingly designed method offers the advantage that, by way of variation of the additional acceleration value, the limiting accelerations, in the case of which a defect (for example, a reduction of the structural integrity of a component of the wind turbine) is suspected, can be adapted easily to the respective conditions (for example, different building foundations, etc.). This is because the vibration characteristics of a wind turbine are determined not only by the wind turbine (geometry, material selection) but rather also, for example, by the building foundation and the depth of the introduction of a foundation pile of the wind turbine into the building foundation.

The method according to the invention preferably furthermore has the following method steps:

determining a wind strength range to which the wind turbine is subjected;

selecting a limiting cumulative frequency distribution from a plurality of different limiting cumulative frequency distributions which are each associated with different wind strength ranges, wherein the limiting cumulative frequency distribution is selected as a function of the wind strength range to which the wind turbine is subjected;

comparing a first cumulative frequency value of the cumulative frequency distribution to a second cumulative frequency value of the limiting cumulative frequency distribution for at least one acceleration value; and outputting a warning signal if the second cumulative frequency value is greater than the first cumulative frequency value.

The correspondingly designed method offers the advantage that the output of a warning signal and/or a shutdown of the wind turbine is made dependent on the wind strength to which the wind turbine is subjected. This is because at greater wind strengths the wind turbine and the components of the wind turbine are subjected to greater forces than at lower wind strengths and therefore the components of the wind turbine are also subjected to greater accelerations. The reliability of the wind turbine is therefore enhanced once again by the correspondingly designed method.

The method according to the invention preferably furthermore has the following method steps:

determining a wind direction of the wind to which the wind turbine is subjected;

selecting a limiting cumulative frequency distribution from a plurality of different limiting cumulative frequency distributions which are each associated with different wind directions, wherein the limiting cumulative frequency distribution is selected as a function of the wind direction to which the wind turbine is subjected;

comparing a first cumulative frequency value of the cumulative frequency distribution to a second cumulative frequency value of the limiting cumulative frequency distribution for at least one acceleration value; and outputting a warning signal if the second cumulative frequency value is greater than the first cumulative frequency value.

The correspondingly designed method offers the advantage that the output of a warning signal and/or a shutdown of the wind turbine is made dependent on the wind direction of the wind to which the wind turbine is subjected. This is because the tracking conditions of the wind turbine can change for different wind directions. The correspondingly designed method takes this circumstance into account.

The method according to the invention preferably furthermore has the following method steps:

determining a blade angle of rotor blades of the wind turbine;

selecting a limiting cumulative frequency distribution from a plurality of different limiting cumulative frequency distributions which are each associated with different blade angles, wherein the limiting cumulative frequency distribution is selected as a function of the blade angle which the rotor blades have;

comparing a first cumulative frequency value of the cumulative frequency distribution to a second cumulative frequency value of the limiting cumulative frequency distribution for at least one acceleration value; and outputting a warning signal if the second cumulative frequency value is greater than the first cumulative frequency value.

The correspondingly designed method offers the advantage that the output of a warning signal and/or a shutdown of the wind turbine is made dependent on the blade angles of the rotor blades of the wind turbine. This is because depending on the blade angle of the rotor blades, they are excited to vibrations of different strengths by wind engaging on the rotor blades, and therefore, in operation of the wind turbine, different vibration states result at different blade angles. The correspondingly designed method takes this circumstance into account.

Furthermore, the method according to the invention can be designed in such a manner that the amount of an inclined incident flow on the rotor blades, the soil stiffness of the soil into which the wind turbine is introduced, and turbulence intensities are also taken into consideration for the selection of the limiting cumulative frequency distribution and/or the power ranges of the wind turbine.

The limiting cumulative frequency distribution is preferably generated by the following method steps, which are executed in a time interval before the detection of the plurality of acceleration values:

continuously detecting a plurality of acceleration values, which represent accelerations to which the component of the wind turbine is subjected, each at different points in time within a predefined initial time interval;

storing these acceleration values in an initial acceleration dataset, which is stored in a ring memory having a predefined memory size, and therefore, after reaching the memory size, the acceleration values stored last in the ring memory overwrite the acceleration values stored first;

generating an initial cumulative frequency distribution based on the initial acceleration dataset; and generating the limiting cumulative frequency distribution based on the determined initial cumulative frequency distribution.

The correspondingly designed method offers the advantage that the limiting cumulative frequency distribution can be generated with enhanced accuracy, and therefore the reliability of the wind turbine is enhanced once again.

The limiting cumulative frequency distribution is preferably generated by the following method steps, which are executed in a time interval before the detection of the plurality of acceleration values:

determining a power range of the wind turbine;

selecting a limiting cumulative frequency distribution from a plurality of different limiting cumulative frequency distributions which are each associated with different power ranges, wherein the limiting cumulative frequency distribution is selected as a function of the power range of the wind turbine;

comparing a first cumulative frequency value of the cumulative frequency distribution to a second cumulative frequency value of the limiting cumulative frequency distribution for at least one acceleration value; and outputting a warning signal if the second cumulative frequency value is greater than the first cumulative frequency value.

The correspondingly designed method offers the advantage that the limiting cumulative frequency distribution can be generated with enhanced accuracy, and therefore the reliability of the wind turbine is enhanced once again.

The power ranges of the wind turbine can comprise, for example, a first power range of 1500 kW-3000 kW, a second power range of 3000 kW-4500 kW, a third power range of 4500 kW-6000 kW, and a fourth power range of greater than 6000 kW. A separate limiting cumulative frequency distribution can be associated with each of these power ranges.

BRIEF DESCRIPTION OF THE DRAWINGS

The functionality of the method according to the invention will be explained on the basis of the following figures. In the figures

FIG. 3 shows cumulative frequency distributions of acceleration values of a plurality of wind turbines having a limiting cumulative frequency distribution shown to explain the method ac-cording to the invention.

DETAILED DESCRIPTION OF THE EMBODIMENTS

Figure 1:
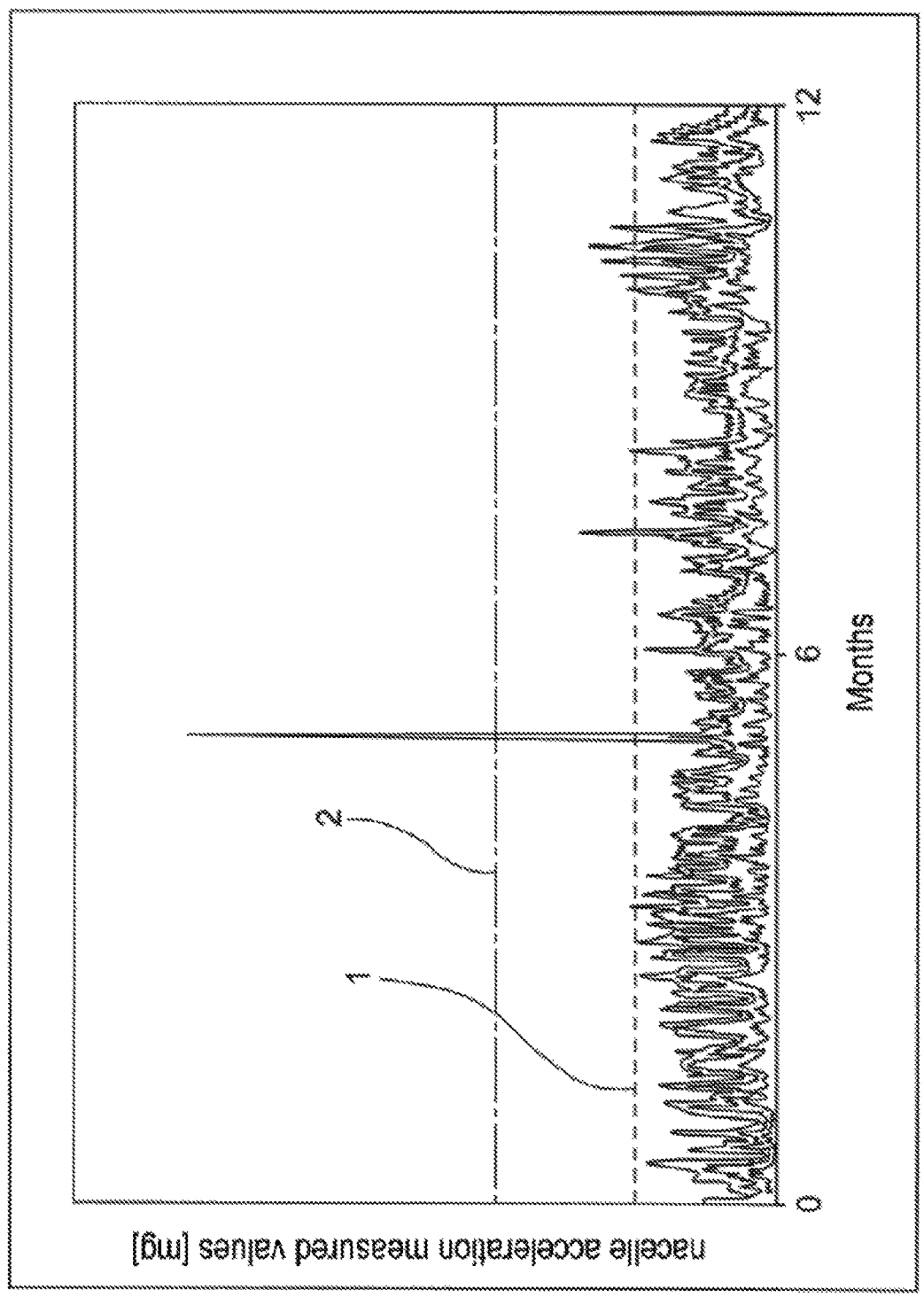
FIG. 1 shows time curves of tower head accelerations for a plurality of wind turbines, in which a method known from the prior art for monitoring the vibration state was applied.

FIG. 1 shows the time curves of tower head accelerations during an operating duration of one year for a plurality of wind turbines, in which a method known from the prior art for monitoring the vibration state was applied. In the diagram shown in FIG. 1, a warning signal threshold 1 and a stop threshold are shown. If a tower head acceleration exceeds the warning signal threshold 1, a warning signal is output. If a tower head acceleration exceeds the stop threshold 2, an operating stop of the wind turbine is initiated.

Figure 2:
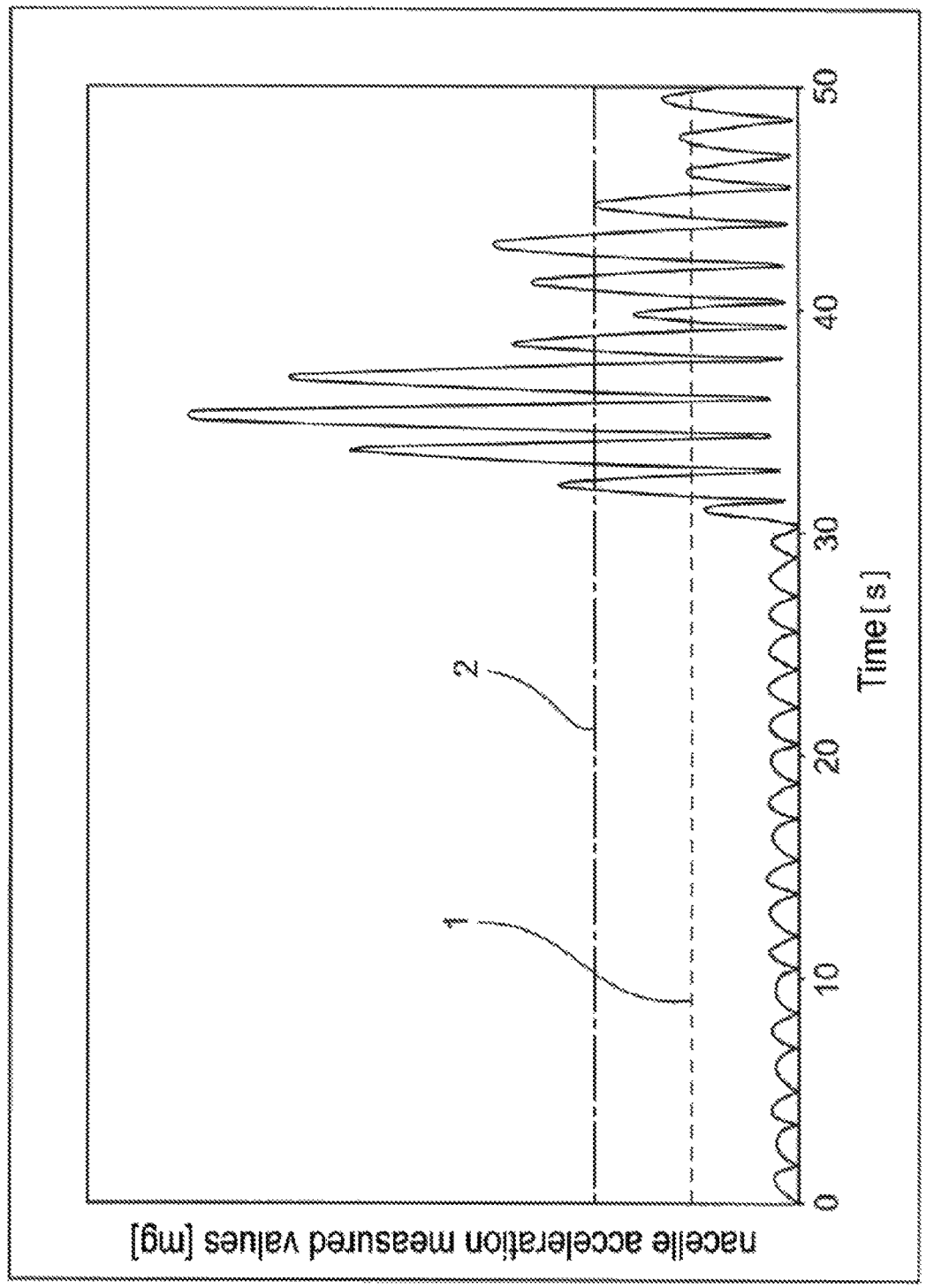
FIG. 2 shows a detail of the time curve of a tower head acceleration of a wind turbine shown in FIG. 1, in which a rotor blade was thrown off.

It is apparent from FIG. 1 that the warning signal threshold was only exceeded a few times and the stop threshold was only exceeded once because of rotor blade damage. FIG. 2 shows a detail of the time curve of the tower head acceleration of a wind turbine shown in FIG. 1, in which both the warning signal threshold and the stop signal threshold were exceeded as a result of a rotor blade being thrown off. A warning signal and a stop signal were generated quasi-simultaneously with the damage event by means of the method known from the prior art for monitoring the vibration state of the wind turbine.

The problem therefore exists in the method known from the prior art for monitoring the vibration state of a wind turbine that the warning signal threshold 1 is frequently only achieved when, for example, the structural integrity of a rotor blade is restricted in such a manner that, a very short time (a few seconds) after exceeding the warning signal threshold 1, the stop signal threshold 2 is already exceeded, because damage to the rotor blade proceeds very rapidly, for example an entire rotor blade is thrown off.

This form of monitoring the vibration state is suitable for avoiding short-term structural failure due to resonance-related overload. This monitoring of threshold value or limiting value is not suitable for a state evaluation of the entire wind turbine or individual component parts/components thereof, for example the rotor blades.

FIG. 3 shows cumulative frequency distributions of acceleration values of a plurality of wind turbines with a limiting cumulative frequency distribution 3 shown. The limiting cumulative frequency distribution can be determined, for example, by means of an aeroelastic simulation of the wind turbine behavior.

Furthermore, it is also possible to generate the limiting cumulative frequency distribution 3 in that, in a time interval before the detection of a plurality of acceleration values for monitoring the wind turbine, a plurality of acceleration values is detected which represent accelerations to which the component of the wind turbine is subjected. This detection of the acceleration values takes place at different points in time within a predefined initial time interval. The acceleration values thus detected are stored in an initial acceleration dataset. Subsequently, based on the initial acceleration dataset, an initial cumulative frequency distribution is generated, whereupon the limiting cumulative frequency distribution 3 is generated based on the determined initial cumulative frequency distribution.

It is apparent from FIG. 3 that the cumulative frequency distributions 4 of intact wind turbines are such that approximately 10% of all acceleration values are less than or equal to 7 mg, approximately 50% of all acceleration values are less than or equal to 9 mg, approximately 80% of all acceleration values are less than or equal to 10 mg, and approximately 99% of all acceleration values are less than or equal to 14 mg.

It is furthermore apparent from FIG. 3 that, in the case of the limiting cumulative frequency distribution 3 for an acceleration value (for example, 10 mg), the cumulative frequency value associated therewith (40% at 10 mg, i.e., 40% of all acceleration values are less than or equal to 10 mg) is always less than the cumulative frequency value (75% at 10 mg, i.e., 75% of all acceleration values are less than or equal to 10 mg) which is associated with the acceleration value (10 mg) of the cumulative frequency distribution 4 of the intact wind turbines.

A cumulative frequency distribution 5 of acceleration values of a component of a wind turbine having reduced structural integrity, i.e., having a reduced stiffness, is also shown in FIG. 3. It is apparent that the wind turbine having reduced stiffness (for example, because of a crack in a rotor blade, a crack in a connecting bolt, a crack in the tower, etc.) has greater acceleration values overall than in the case of the intact wind turbines. A defect of the wind turbine may be diagnosed, for example, in that a first cumulative frequency value (for example, 80% at 17 mg, i.e., 80% of all acceleration values are less than or equal to 17 mg) of the cumulative frequency distribution 5 is compared to a second cumulative frequency value (98% at 17 mg) of the limiting cumulative frequency distribution 3. It is apparent in this case that the second cumulative frequency value (98%) is greater than the first cumulative frequency value (80%), and therefore a defect of the monitored wind turbine is present with great reliability and as a result thereof a warning signal can be output.

By means of the method according to the invention for monitoring the vibration state of a wind turbine, changes and weakenings of the structural integrity of components of the wind turbine may be recognized early. Therefore, it is possible to prevent damage which prevents the functionality of the wind turbine from occurring suddenly and surprisingly, thus, for example, throwing off of a rotor blade of the wind turbine.

LIST OF REFERENCE NUMERALS

1 warning signal threshold
2 stop threshold
3 limiting cumulative frequency distribution
4 cumulative frequency distribution of intact wind turbines
5 cumulative frequency distribution of a wind turbine having reduced structural integrity/reduced stiffness

The invention claimed is:

1. A method for monitoring the vibration state of a wind turbine comprising:
    detecting a plurality of acceleration values, which represent accelerations to which a component of the wind turbine is subjected, each at different points in time within a predefined time interval;
    storing the acceleration values in an acceleration dataset;
    generating a cumulative frequency distribution based on the acceleration dataset;
    comparing a first cumulative frequency value of the cumulative frequency distribution to a second cumulative frequency value of a limiting cumulative frequency distribution for at least one acceleration value; and
    outputting a warning signal if the second cumulative frequency value is greater than the first cumulative frequency value.

2. The method of claim 1, wherein the limiting cumulative frequency distribution is generated by the steps of
    detecting a plurality of acceleration values, which represent accelerations to which the component of the wind turbine is subjected, each at different points in time within a predefined initial time interval;
    storing these acceleration values in an initial acceleration dataset;
    generating an initial cumulative frequency distribution based on the initial acceleration dataset; and
    generating the limiting cumulative frequency distribution based on the determined initial cumulative frequency distribution;
    wherein the steps are executed in a time interval before the detection of the plurality of acceleration values for generating the first cumulative frequency value of the cumulative frequency distribution.

3. The method of claim 1, wherein the limiting cumulative frequency distribution for a wind turbine of a wind turbine fleet consisting of a plurality of structurally-equivalent wind turbines is generated by the steps of:
    for at least two wind turbines of the wind turbine fleet, detecting a plurality of acceleration values, which represent accelerations to which the component of the respective wind turbine is subjected, each at different points in time within a predefined initial time interval;
    storing these acceleration values in an initial acceleration dataset;
    generating an initial cumulative frequency distribution based on the initial acceleration dataset; and
    generating the limiting cumulative frequency distribution based on the determined initial cumulative frequency distribution;
    wherein the steps are executed in a time interval before detecting the plurality of acceleration values for generating the first cumulative frequency value of the cumulative frequency distribution.

4. The method of claim 1, wherein the limiting cumulative frequency distribution is generated by the steps of:
    generating a limiting acceleration dataset by adding an additional acceleration value to each of the acceleration values detected in the initial time interval and stored in the initial acceleration dataset;

storing the limiting acceleration dataset; and generating the limiting cumulative frequency distribution based on the limiting acceleration dataset.

5. The method of claim 1, further comprising:

determining a wind strength range and/or a wind direction of the wind to which the wind turbine is subjected;

selecting a limiting cumulative frequency distribution from a plurality of different limiting cumulative frequency distributions which are each associated with different wind strength ranges and/or different wind directions, wherein the limiting cumulative frequency distribution is selected as a function of the wind strength range and/or the wind direction to which the wind turbine is subjected;

comparing a first cumulative frequency value of the cumulative frequency distribution to a second cumulative frequency value of the limiting cumulative frequency distribution for at least one acceleration value; and outputting a warning signal if the second cumulative frequency value is greater than the first cumulative frequency value.

6. The method of claim 1, further comprising:

determining a wind direction of the wind to which the wind turbine is subjected;

selecting a limiting cumulative frequency distribution from a plurality of different limiting cumulative frequency distributions which are each associated with different wind directions, wherein the limiting cumulative frequency distribution is selected as a function of the wind direction to which the wind turbine is subjected;

comparing a first cumulative frequency value of the cumulative frequency distribution to a second cumulative frequency value of the limiting cumulative frequency distribution for at least one acceleration value; and outputting a warning signal if the second cumulative frequency value is greater than the first cumulative frequency value.

7. The method of claim 1, further comprising:

determining a blade angle of rotor blades of the wind turbine;

selecting a limiting cumulative frequency distribution from a plurality of different limiting cumulative frequency distributions which are each associated with different blade angles, wherein the limiting cumulative frequency distribution is selected as a function of the blade angle which the rotor blades have;

comparing a first cumulative frequency value of the cumulative frequency distribution to a second cumulative frequency value of the limiting cumulative frequency distribution for at least one acceleration value; and outputting a warning signal if the second cumulative frequency value is greater than the first cumulative frequency value.

8. The method of claim 1, wherein the limiting cumulative frequency distribution is generated by the steps of:

continuously detecting a plurality of acceleration values, which represent accelerations to which the component of the wind turbine is subjected, each at different points in time within a predefined initial time interval;

storing these acceleration values in an initial acceleration dataset, which is stored in a ring memory having a predefined memory size, and therefore, after reaching the memory size, the acceleration values stored last in the ring memory overwrite the acceleration values stored first;

generating an initial cumulative frequency distribution based on the initial acceleration dataset; and generating the limiting cumulative frequency distribution based on the determined initial cumulative frequency distribution;

wherein the steps are executed in a time interval before the detection of the plurality of acceleration values for generating the first cumulative frequency value of the cumulative frequency distribution.

9. The method as claimed in any one of the preceding claims, further comprising:

determining a power range of the wind turbine;

selecting a limiting cumulative frequency distribution from a plurality of different limiting cumulative frequency distributions which are each associated with different power ranges, wherein the limiting cumulative frequency distribution is selected as a function of the power range of the wind turbine;

comparing a first cumulative frequency value of the cumulative frequency distribution to a second cumulative frequency value of the limiting cumulative frequency distribution for at least one acceleration value; and outputting a warning signal if the second cumulative frequency value is greater than the first cumulative frequency value.

10. A wind turbine comprising at least one acceleration sensor and a data processing unit connected thereto via a data line, wherein the data processing unit is configured to execute the method of claim 1.

* * * * *